Dec. 10, 1963 — J. T. BERNSTEIN — 3,113,854
METHOD AND APPARATUS FOR SEPARATING GASEOUS MIXTURES
Filed Aug. 14, 1961 — 3 Sheets-Sheet 1

INVENTOR.
JOSEPH T. BERNSTEIN
BY Shanley & O'Neil
ATTORNEYS

INVENTOR.
JOSEPH T. BERNSTEIN
BY Shanley & O'Neil
ATTORNEYS

INVENTOR.
JOSEPH T. BERNSTEIN
BY Shanley & O'Neil
ATTORNEYS

United States Patent Office 3,113,854
Patented Dec. 10, 1963

3,113,854
METHOD AND APPARATUS FOR SEPARATING GASEOUS MIXTURES
Joseph T. Bernstein, Westport, Conn., assignor to Air Products and Chemicals, Inc., a corporation of Delaware
Filed Aug. 14, 1961, Ser. No. 129,942
18 Claims. (Cl. 62—28)

This invention relates to the separation of gaseous mixtures and more particularly to methods of and apparatus for fractionating gaseous mixtures under low temperature.

The power required to effect separation of gaseous mixtures includes the thermodynamic work of separation and an energy loss represented by the irreversibility of the process required for the separation, such as the compression and fractionation processes. The irreversibility of the compression process constitutes a major portion of such energy loss while the irreversibility of the fractionation process comprises more than fifty percent of the energy loss due to the irreversibility of the low temperature processes. The provision of a fractionating process which operates in a more reversible manner would not only reduce energy losses due to irreversibility of the low temperature fractionation processes but would decrease the required work of compression and thereby substantially reduce energy losses due to the irreversibility of the compression process.

The desirability of decreasing the irreversibility of the fractionating process has been appreciated in the past and theoretical studies have been made on ideal reversible columns operating under hypothetical situations. Also, low temperature fractionating cycles have been proposed in which there is simultaneous heat and mass transfer between fractionating zones under different pressures with a view toward reducing the irreversibility of the fractionating process. In order to obtain this simultaneous transfer of heat and mass such cycles require unique and structurally complicated apparatus to form the fractionating columns. It is not known that such unique fractionating columns have been constructed and operated and there is a question with respect to their practicability and reliability. In any event the complexity of the unique structures would present serious manufacturing problems requiring a substantial capital investment as compared with conventional column structures as well as maintenance problems and the advantages gained by reduced power requirements would be materially nullified.

It is an object of the present invention to provide a novel method of and apparatus for separation of gaseous mixtures which reduces the irreversibility of the fractionation process to the degree theoretically obtainable by prior cycles without employing unique structurally complicated apparatus but by the novel use of well-known components employed in conventional low temperature separation cycles.

Conventional two-stage cycles such as employed for the separation of air into oxygen and nitrogen components includes first and second fractionating zones operating under different pressures. In such cycles, one fractionating zone operates under superatmospheric pressure substantially corresponding to the pressure of the air feed and the second fractionating zone operates under lower pressure several pounds in excess of atmospheric pressure to insure flow from the cycle of product gases. The air feed undergoes preliminary separation in the fractionating zone under high pressure producing a liquid fraction consisting of crude oxygen and a gaseous fraction comprising substantially pure nitrogen and the crude oxygen is fed to the low pressure fractionating zone where the separation is completed producing liquid oxygen component collecting in the base of the low pressure fractionating zone and gaseous nitrogen component withdrawn from the top of the zone. The liquid oxygen and the high pressure nitrogen gas are brought into heat exchange effecting relation by means of a condenser-evaporator which may form an integral part of the over-all column structure joining the upper end of the high pressure fractionating column to the low pressure fractionating column or may comprise a two pass heat exchange device referred to as an outside reboiler physically located apart from the high pressure column and the low pressure column except for the required piping connections. The heat interchange between the liquid oxygen and the high pressure nitrogen gas results in vaporization of liquid oxygen to provide reboil for the low pressure fractionating column and product gas while effecting liquefaction of the high pressure nitrogen which is used as a reflux for the high pressure and the low pressure columns. The nitrogen gas is under high pressure relative to the liquid oxygen because of the difference in the boiling points of oxygen and nitrogen and the pressure differential must be sufficiently great so that the heat interchange results in the degree of reboil and reflux production required for efficient column operation. The air feed to the cycle is compressed to at least the pressure existing in the high pressure fractionating column and power requirements of the conventional two-stage fractionating cycle are determined in part by the required operating pressure of the high pressure column established by the reboil and reflux requirements which relate to the degree of irreversibility of the fractionating process.

In a copending application of Lee S. Gaumer, Jr., Serial No. 51,847, filed August 25, 1960, for "Method and Apparatus for Separating Gaseous Mixtures," there is disclosed an improved cycle having two stages or zones of fractionation under different pressures and including two reboilers or condenser-evaporators. Both of the reboilers are interconnected with the stages of fractionation in such a manner as to effect the required reboil and reflux production with minimum pressure differential between the two stages of rectification and also to decrease the irreversibility of the over-all fractionating process thereby obtaining the desired separation with the high pressure stage operating under substantially reduced pressure, as compared with conventional cycles. In particular, in accordance with the above-mentioned Gaumer application, reboil for the low pressure fractionating zone is obtained by establishing heat interchange between liquid component collected in a low pressure fractionating zone and relatively high pressure gaseous material comprising components of the gaseous mixture undergoing separation. This heat interchange results in such varporization of the liquid component to provide the required reboil for the low pressure fractionating zone and at least partial liquefaction of the gaseous material which is introduced into the high pressure fractionating zone. The Gaumer application also provides, in combination with the foregoing heat interchange, the establishment of a second and separate heat interchange between gaseous fraction collecting in the high pressure fractionating zone and relatively low pressure liquid material including components of the gaseous mixture undergoing separation. The second heat interchange effects liquefaction of the gaseous fraction to provide reflux for both the high pressure fractionating zone and the low pressure fractionating zone and also effects at least partial vaporization of the liquid material which is introduced into the low pressure fractionating zone in such a manner as to decrease the irreversibility of the fractionating process occurring therein. The high pressure gaseous material may comprise gaseous mixture prior to introduction into the fractionating zones or gaseous material withdrawn from the high pressure fractionating zone, and the liquid material may comprise liquid formed in a low pressure fractionating zone.

The present invention comprises a novel method of and apparatus for separating gaseous mixtures which comprises an improvement on the invention disclosed in the copending Gaumer application and makes it possible to obtain the desired separation with the high pressure fractionating zone operated under further reduced pressure, as compared to conventional cycles.

According to the present invention the advantages are obtained by establishing a first heat interchange between the total feed mixture entering the operation and liquid component collecting in the low pressure fractionating zone in combination with a second interchange between gaseous fraction collecting in the high pressure fractionating zone and relatively low pressure liquid material which includes components of the gaseous mixture undergoing separation. The first heat interchange may result in partial liquefaction of the total gaseous feed mixture or may be accomplished in such a manner as to effect partial rectification of the feed mixture with a resulting improvement on the reflux ratios of the fractionating zones and the provision with minimum expenditure of power of a fluid suitable for expansion with work to provide refrigeration for the operation.

The foregoing and other objects and features of the present invention will be more fully understood from the following detailed description considered in connection with the accompanying drawings which disclose several embodiments of the invention. It is to be expressly understood however that the drawings are designed for purposes of illustration only and not as a definition of the limits of the invention, reference for the latter purpose being had to the appended claims.

In the drawings, in which similar reference characters denote similar elements throughout the several views.

Figure 1:
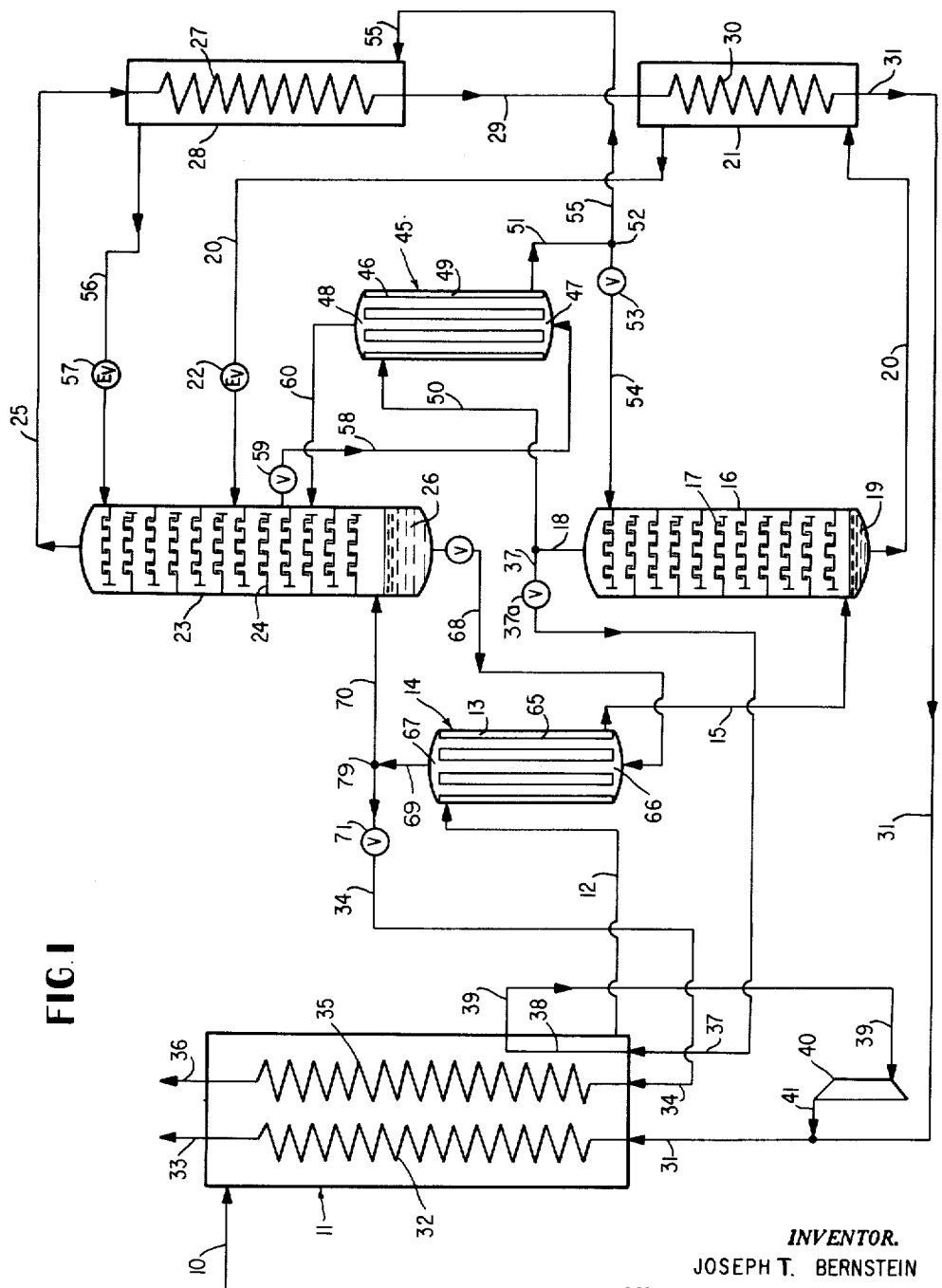
FIGURE 1 is a diagrammatic view of a low temperature cycle embodying principles of the present invention.

With reference more particularly to FIGURE 1 of the drawings, a cycle embodying the principles of the present invention is disclosed therein for the separation of air into oxygen and nitrogen components. Although the present invention is disclosed and described in the environment of air separation, it is to be expressly understood that the principles of the present invention are not limited to air separation cycles but may be employed in low temperature separation of other gaseous mixtures. As shown, atmospheric air previously treated to remove moisture and carbon dioxide and compressed to a superatmospheric pressure enters the cycle through a conduit 10 and is conducted thereby to the shell side of a heat exchange device 11 wherein the air flows in countercurrent heat exchange effecting relation with oxygen and nitrogen components as described below, and is thereby cooled to a relatively low temperature which may approach saturation temperature at the existing pressure. The cooled air is withdrawn from the heat exchange device through conduit 12 and is conducted thereby for flow through the shell side 13 of a two-pass heat exchange device 14. From the heat exchange device 14 the air is passed through a conduit 15 to a high pressure fractionating zone of column 16.

The high pressure column 16 may be of conventional construction including liquid-vapor contact means such as a series of fractionating plates 17 provided with bubble caps as shown. The air undergoes preliminary separation in the high pressure column producing gaseous low boiling point fraction, that is substantially pure nitrogen, which collects in the upper end of the column and is withdrawn therefrom through conduit 18, and liquid high boiling point fraction, that is crude oxygen, which collects in a pool 19 in the bottom of the column. The crude oxygen is withdrawn from the high pressure column by conduit 20 and after flowing through subcooler 21 and expansion in valve 22 is introduced at an intermediate feed point in a low pressure fractionating zone of column 23. The low pressure column 23 may also be of conventional construction and provided with liquid-vapor contact means such as fractionating plates 24 of the bubble cap type. In the low pressure column, the separation of the air is continued with gaseous low boiling point component, i.e., nitrogen, collecting at the upper end of the column and being withdrawn therefrom through conduit 25 and with liquid high boiling point component, i.e., oxygen, collecting in a pool 26 formed in the base of the column.

Gaseous nitrogen component is conducted by the conduit 25 through a passageway 27 of a subcooler 28 and then by conduit 29 through passageway 30 of the subcooler 21. The gaseous nitrogen component then flows through conduit 31 to passageway 32 of the heat exchange device 11 for countercurrent heat exchange effecting relation with the incoming air as described above, the gaseous nitrogen component leaving the heat exchanger 11 through conduit 33 at substantially ambient temperature. As will be described in detail below, oxygen component in gaseous phase is passed by way of a conduit 34 for flow through passageway 35 of the heat exchange device 11 in countercurrent heat exchange effecting relation with the air feed and gaseous oxygen leaves the heat exchange device 11 through a conduit 36 also at substantially ambient temperature. Refrigeration for the cycle may be obtained by expansion with work of a portion of the high pressure nitrogen gas withdrawn from the high pressure column through the conduit 18. As shown, a conduit 37 having a control valve 37a conducts a portion of the high pressure nitrogen gas for flow through a passageway 38 which may be located at the cold end of the heat exchange device 11 to warm the high pressure nitrogen gas to a proper temperature for subsequent expansion with the production of external work. From the warm end of the heat exchange passageway 38 the warmed high pressure nitrogen gas is conducted by conduit 39 to an expansion engine 40 and effluent of the expansion engine is conducted by conduit 41 and merged with the gaseous nitrogen product flowing in the conduit 31 to the heat exchange device 11.

As discussed above, the aforementioned Gaumer application provides a low temperature separation cycle in which energy losses due to irreversibility are substantially reduced by the combination of heat exchange steps uniquely related to a fractionating process taking place in the high pressure zone in the relatively low pressure zone; the heat exchange steps being considered as separate condensing-evaporating steps both of which are associated with each of the fractionating zones. The first condensing-evaporating step comprises (a) establishing heat exchange between liquid component of the low pressure fractionating zone and gaseous material under relatively high pressure which includes components of the gaseous mixture undergoing separation to effect vaporization of liquid component and at least partial liquefaction of the gaseous material and (b) utilization of vaporized liquid component to provide reboil for the low pressure fractionating zone, while the second condensing-evaporating step comprises (a) establishing heat exchange between gaseous low boiling point fraction of the high pressure fractionating zone and liquid material under relatively low pressure which includes components of the gaseous mixture to effect liquefaction of the gaseous low boiling point fraction and vaporization of the liquid material, and (b) utilization of vaporized liquid material as upwardly flowing vapor in the low pressure fractionating zone. As shown in FIGURE 1, the second condensing-evaporating step is accomplished by utilization of an outside reboiler 45 which may comprise a two-pass heat exchange device of conventional construction having one pass formed by a plurality of vertically disposed tubes 46 communicating with a lower chamber 47 and an upper chamber 48, as viewed in the drawing, and with the second pass comprising shell space or chamber 49 surrounding the tubes. The shell space 49 of the reboiler 45, which may be considered as a nitrogen condenser, is supplied at its upper end with high pressure gaseous nitrogen withdrawn from the high pressure column 16 through a conduit 50 connected to the conduit 18. The high pressure nitrogen gas, liquefied in the reboiler 45 as described below, is withdrawn by way of conduit 51 and divided at point 52 with one portion, as determined by control valve 53, being conducted by conduit 54 to the top of the high pressure column 16 and there introduced as reflux while another portion is conducted by conduit 55, passed through the shell side of subcooler 28 and then through conduit 56 and expansion valve 57 for introduction into the top of the low pressure column 23 as reflux. Liquefaction of high pressure gaseous nitrogen fed to the reboiler 45 is accomplished by passing liquid material withdrawn from the low pressure column 23 at a level below the feed point of the liquid crude oxygen and above the pool of liquid oxygen 26 by means of a conduit 58 which communicates with the chamber 49 of the reboiler, the conduit 58 having a control valve 59. Such liquid material is vaporized in the reboiler 45 while effecting liquefaction of high pressure nitrogen gas and the vaporized material flows from the upper chamber 48 and through conduit 60 into the low pressure column at a level below the conduit 59 and above the pool 26.

As mentioned above, it is an object of the present invention to provide a novel method of and apparatus for separating gaseous mixtures which makes it possible to achieve the desired separation with the high pressure column operating under reduced pressure as compared to the method and apparatus disclosed in the above-mentioned copending Gaumer application. This is achieved by the provision of a novel arrangement for establishing the first condensing-evaporating step of the copending Gaumer application described above. In accordance with the present invention, the required vaporization of high boiling point liquid component is accomplished by establishing heat interchange between high boiling point liquid component and relatively warm gaseous material under relatively high pressure which comprises the total feed mixture to the cycle. The term "gaseous material" as used in the appended claims thus includes components of the feed mixture with the percentage of the high boiling point component, such as oxygen, being less than the percentage of the high boiling point component of the liquid high boiling point fraction, such as liquid crude oxygen collecting in the pool 19 in the base of the high pressure column 16. As previously described, the total air feed flows through the shell side 13 of the heat exchange device 14, which may be considered as a liquid oxygen evaporator, before entering the high pressure column 16. The heat exchange device 14 includes a plurality of tubes 65 located within the space 13 and communicating at their lower and upper ends, as viewed in the drawing, with a chamber 66 and a chamber 67, respectively. Liquid oxygen product is withdrawn from the pool 26 of the low pressure column through conduit 68 and conducted thereby to the chamber 66 and hence to the tubes 65 and is evaporated in heat interchange with the total quantity of relatively warm air feed flowing through the shell side of the heat exchange device. The vaporized oxygen collects in the chamber 67 and is withdrawn therefrom through conduit 69 which is divided at point 79 with one portion flowing through conduit 70 to the low pressure column above the pool of liquid oxygen 26 to provide reboil and with another portion flowing through the conduit 34 as oxygen product gas, a control valve 71 being provided in the conduit 34. The feature provided by the present invention of evaporating a quantity of the high boiling point liquid component to provide reboil for the low pressure column and gaseous product from the operation by heat interchange with the total gaseous mixture fed to the cycle makes it possible to evaporate the required quantity of high boiling point liquid component with a smaller pressure differential and hence a material reduction in the pressure of the feed mixture.

As an operating example of the cycle shown in FIGURE 1, air under a pressure of about 68 p.s.i.a. and a temperature of about 100° F. enters the cycle through conduit 10 at about 1300 pound mols per hour and is cooled to about −285° F. upon flowing through the heat exchange device 11. The total air feed now under pressure of about 65 p.s.i.a. flows through the heat exchange device 14 and is cooled to about −287° F. with about 37% of the air feed being liquefied. The total air feed then enters the high pressure fractionating column 16 which operates under a pressure of about 65 p.s.i.a. The total air feed flows through the heat exchange device 14 in heat interchange with about 392 pound mols per hour of liquid oxygen withdrawn from the low pressure column at about −298° F. and about 24 p.s.i.a. The heat interchange results in total vaporization of the 392 pound mols per hour of liquid oxygen and about 114 pound mols per hour of gaseous oxygen at a temperature of about −291° F. are returned to the low pressure column through conduit 70 to provide reboil and about 278 pound mols per hour at the same temperature flow through the conduit 34 and the passageway 35 of heat exchange device 11 and leave the cycle through conduit 36 at about 96° F. and about 15 p.s.i.a. About 858 pound mols per hour of liquid crude oxygen at a temperature of about −288° F. are withdrawn from the high pressure column through conduit 20, cooled to about −292° F. upon flowing through the subcooler 21, further cooled to about −311° F. upon expansion in the valve 22 to about 20 p.s.i.a. and then enter the low pressure fractionating column 23. About 926 pound mols per hour of gaseous nitrogen at a temperature of −317° F. are withdrawn from the top of the low pressure column through conduit 25, and warmed to about −300° F. upon flowing through the subcooler 21. About 96 pound mols per hour of high pressure nitrogen gas at a temperature of about −293° F. flow through the passageway 38 of the heat exchange device 11 and thereby warmed to about −155° F. At about that temperature the 96 pound mols per hour of nitrogen gas enters to the expansion engine 40 and the effluent therefrom at a temperature of about −234° F. is merged with the nitrogen product gas in conduit 31 and about 1022 pound mols per hour of nitrogen gas at a temperature of about −290° F. and a pressure of about 18 p.s.i.a. flows through the passageway 32 of the heat exchange device 11 in countercurrent heat exchange effecting relation with the air feed, such nitrogen leaves the heat exchange device through conduit 33 at a temperature of about 96° F. and at substantially atmospheric pressure. Of the 840 pound mols per hour of high pressure nitrogen gas leaving the high pressure column through conduit 18 at about −293° F. about 744 pound mols per hour flow through conduit 50 to the reboiler 45 and such nitrogen leaves the reboiler in liquid phase at about −293° F. with about 398 pound mols per hour flowing through conduit 54 to provide reflux for the high pressure column and about 346 pound mols per hour flowing through conduit 55 to the subcooler 28 wherein its temperature is reduced to about −310° F. and after expansion in valve 57 to about 18 p.s.i.a. and about −317° F., is introduced into the low pressure column as reflux. About 750 pound mols per hour of liquid material comprising about 80% oxygen at a temperature of about −298° F. flows through the conduit 58 to the reboiler 45 and this material in vapor phase at about −296° F. is returned through conduit 60 to the low pressure column.

The advantages obtained from the present invention will be appreciated more fully by comparing the foregoing example to corresponding examples for a cycle like FIGURE 1 but modified, first to include a conventional oxygen-nitrogen reboiler-refluxing condenser and second, in accordance with the Gaumer application. In the conventional two-stage column modification it would be necessary to operate the high pressure column at a pressure of about 79 p.s.i.a. in order to liquefy about 744 pound mols of high pressure nitrogen gas and vaporize 392 pound mols per hour of liquid oxygen. Assuming the same pressure drop existed between the feed inlet and the high pressure column, the conventional cycle would require air feed under a pressure of about 82 p.s.i.a. In the modification according to the Gaumer application, the required liquid oxygen vaporization could be obtained with the high pressure column operating under a pressure of about 71 p.s.i.a., and therefore, with the same assumption, the cycle would require air feed under a pressure of about 74 p.s.i.a. Thus, the concept of the present invention of passing the total feed mixture in heat interchange with the liquid high boiling point component required to be vaporized results in material saving in power requirements.

Figure 2:
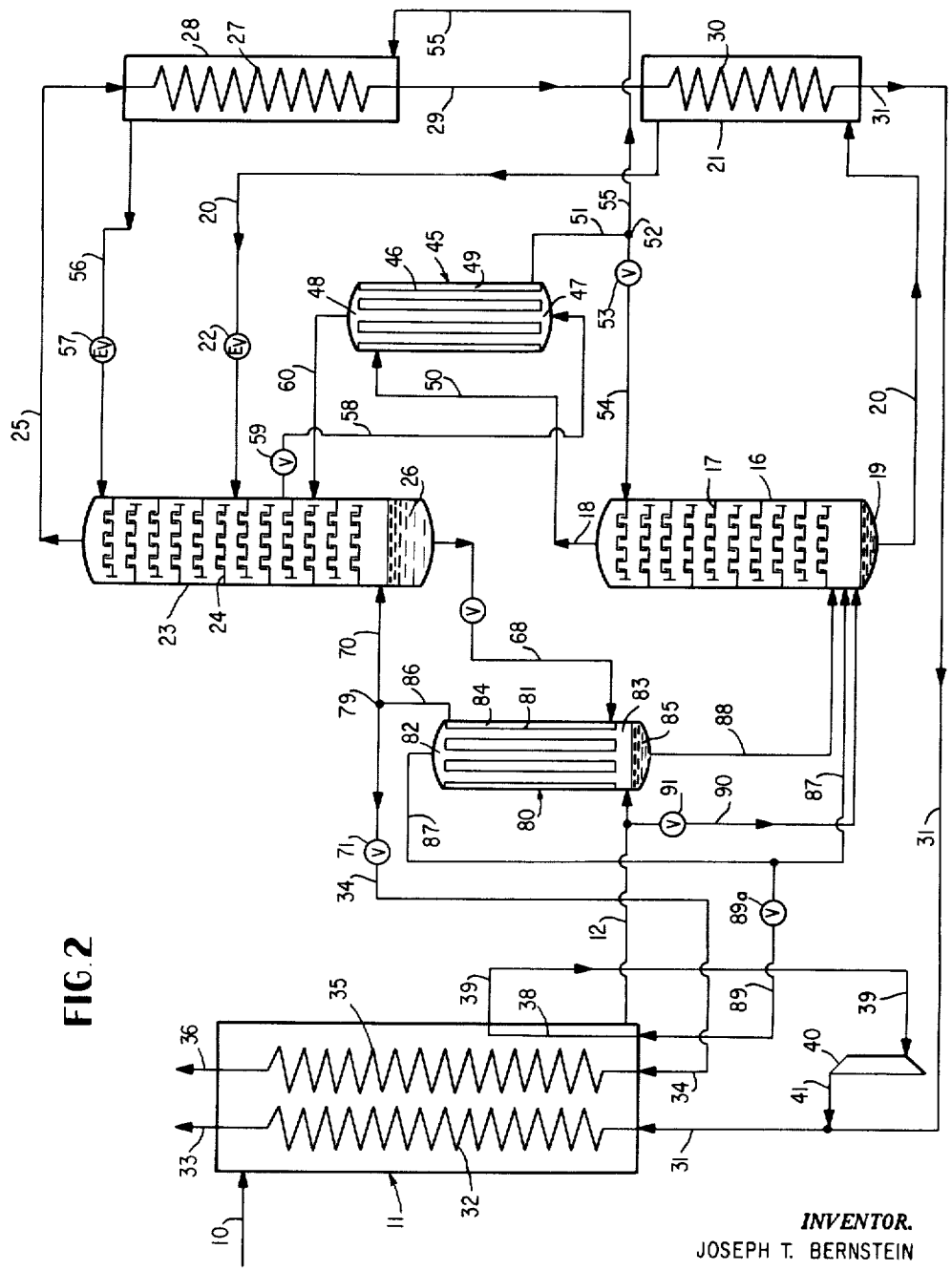
FIGURE 2 is a diagrammatic view of a low temperature cycle in accordance with another embodiment of the present invention.

In the embodiment of the invention shown in FIGURE 2 of the drawings the heat interchange between the total feed mixture and the quantity of liquid high boiling point component required to be vaporized is accomplished under conditions which result in partial rectification of the feed mixture. This feature makes it possible to further increase the power savings by improving the reflux ratio of the fractionating zones and by providing with less power expenditure a fluid for expansion with work to provide refrigeration for the operation. As shown, these advantages are obtained by employing a dephlegmator 80 in place of the heat exchange device 14 of FIGURE 1. The dephlegmator includes a plurality of vertically disposed tubes 81, the upper ends of which communicate with an upper chamber 82 and the lower ends with a lower chamber 83, as viewed in the drawing, and a chamber or shell space 84 which surrounds the tubes. Cool feed mixture, such as air, from the heat exchange device 11 is conducted by the conduit 12 to the space 83 above the pool of liquid 84 collecting therein as described below, and liquid high boiling point component, such as liquid oxygen, from the low pressure fractionating zone, is conducted by the conduit 68 to the lower end of the shell space 84. The oxygen emerges from the upper end of the space 84 in vapor phase through conduit 86 which is joined at point 79 with conduit 34 carrying the gaseous oxygen product and conduit 70 which feeds oxygen vapor to the low pressure column as reboil. The air feed flows from the chamber 83 upwardly through the tubes 81 and is partly condensed by heat interchange with the oxygen, and the condensed air flows downwardly in the tubes 81 in contact with upwardly flowing vapor to effect partial rectification of the air. Thus liquid collecting in the pool 85 is enriched in high boiling point component, that is, oxygen enriched air, and the uncondensed portion of the feed flowing into the chamber 82 and from the latter chamber through a conduit 87 is enriched in low boiling point component, that is, nitrogen. The liquid is withdrawn from the pool 85 through conduit 88 and introduced into the high pressure column 16. The nitrogen rich vapor in the conduit 87 is also introduced into the base of the high pressure column. This operation attains the advantages of the cycle of FIGURE 1 and in addition improves the reflux ratios in the fractionating zones which makes it possible to improve recovery or reduce the pressure of the feed mixture.

As mentioned above the feature of effecting vaporization of the liquid high boiling point component with partial rectification of the feed mixture makes it possible to obtain with relatively low power a fluid suitable for work expansion. As shown in FIGURE 2 a part of the nitrogen rich vapor in conduit 87 may be passed through conduit 89, having a control valve 89a and the passageway 38 of the heat exchange device 11 and then fed to the expansion engine 40. Such fluid which may contain about 92% nitrogen, represents substantially less expenditure of power than the high pressure nitrogen stream fed to expansion engine 40 in the arrangement of FIGURE 1.

The feature of effecting partial rectification of the feed mixture while vaporizing the liquid high boiling point component may be employed with the concept of passing the total feed mixture in heat interchange with the portion of the liquid high boiling point component required to be vaporized in order to provide reboil for the low pressure fractionating zone and gaseous product, as described above, or may be employed in an arrangement in which a part of the total feed mixture undergoes partial rectification while in heat interchange with liquid high boiling point component to provide the required gaseous product, reboil for the low pressure fractionating zone, and a quantity of vapor enriched in the low boiling point component as is required for work expansion. As shown in FIGURE 2, a portion of the air feed in conduit 12, instead of entering the dephlegmator 80 may flow directly to the high pressure column 16 through a conduit 90 which is provided with a control valve 91. The portion of the air feed flowing to the dephlegmator is sufficient to vaporize the required quantity of liqiud oxygen as well as to provide a quantity of nitrogen enriched vapor in conduit 87 to meet the requirements of the expansion engine 40. In order to provide control it is preferable that the quantity of enriched nitrogen vapor in conduit 87 exceeds the requirements of the expansion engine and therefore in this arrangement a quantity of nitrogen enriched vapor will flow by way of conduit 87 to the high pressure fractionating zone with a resulting improvement in the reflux ratios.

The operating example of FIGURE 1 will apply to the foregoing arrangement with the following changes: Of the 1300 pound mols per hour of air in conduit 12 about 590 pound mols per hour will flow to the dephlegmator 80 and about 710 pound mols per hour will flow through conduit 90 to the high pressure column, the latter portion of the air feed entering the column at about $-285°$ F. About 495 pound mols per hour of oxygen enriched liquid air flows at about $-285°$ F. through conduit 88 to the high pressure column and about 96 pound mols per hour of nitrogen enriched gaseous air (about 92% nitrogen) at about $-290°$ F. flows from the dephlegmator through conduit 87. Substantially the total fluid in conduit 87 flows to the expansion engine 40 while the excess which may comprise about 5–10 pound mols per hour depending upon the refrigeration requirements is introduced into the high pressure column. The pressure of the air feed to the cycle may be reduced several pounds with respect to the example of FIGURE 1 and a further reduction in the air feed pressure could be obtained by passing the total feed mixture to the dephlegmator 80.

Figure 3:
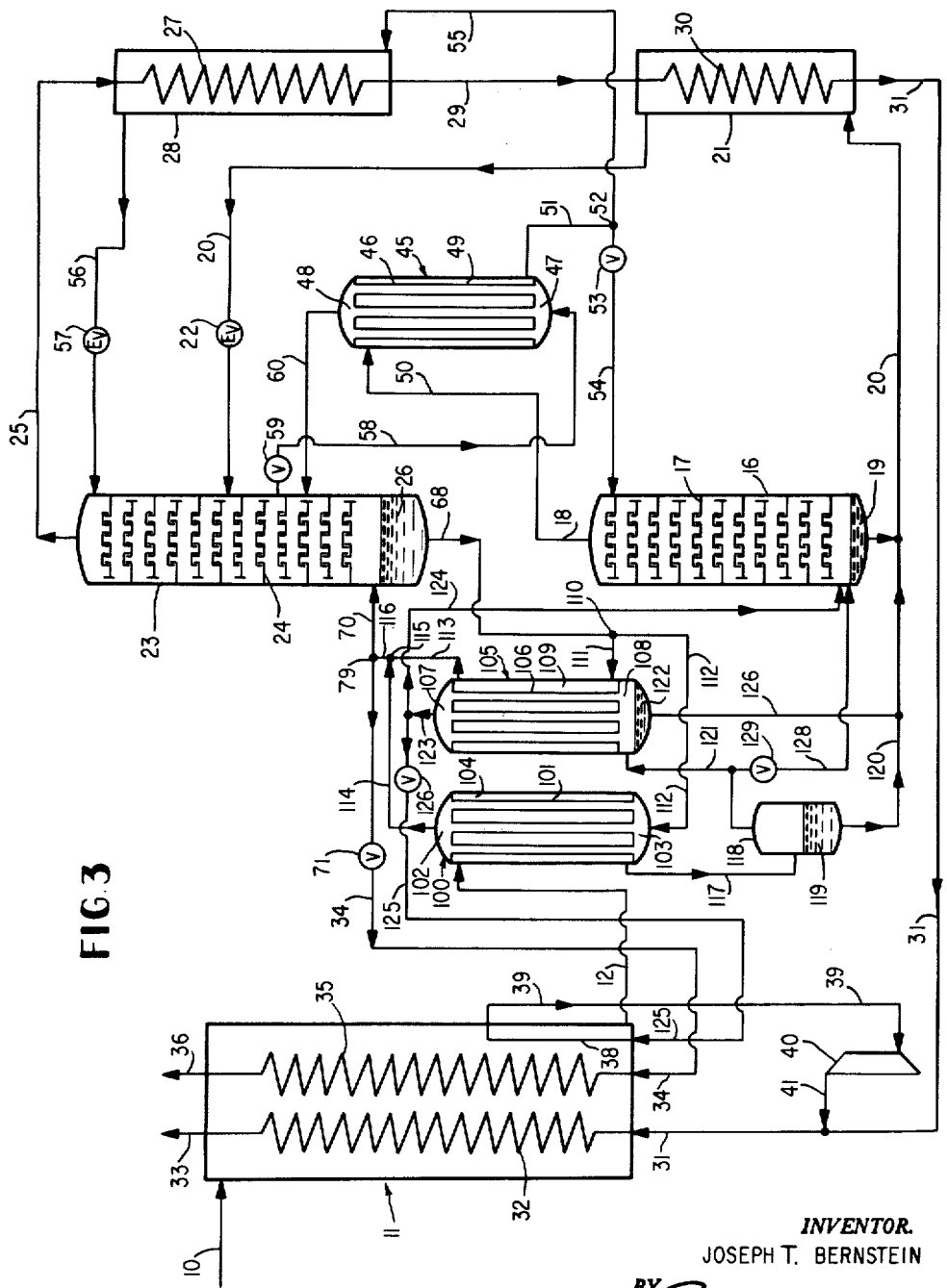
FIGURE 3 is a diagrammatic view of a low temperature separation in accordance with still another embodiment of the present invention.

In the embodiment of the invention shown in FIGURE 3 of the drawings the combination of a condenser and a dephlegmator is employed to establish the required heat interchange between the feed mixture and the high boiling point liquid product produced in the low pressure fractionating zone. As shown, the condenser includes a heat exchange device 100 having a plurality of tubes 101 communicating with an upper chamber 102 and lower chamber 103, as viewed in the drawing, and a shell space 104 surrounding the tubes. The dephlegmator 105 includes a plurality of tubes 106 communicating with an upper chamber 107 and a lower chamber 108, as viewed in the drawing, and a shell space 109 surrounding the tubes. The conduit 68 supplying liquid oxygen from the low pressure column is divided at point 110 into a conduit 111 communicating with the shell space 109 of the dephlegmator and a conduit 112 communicating with the space 103 of the condenser. Vaporized oxygen is withdrawn from the shell space of the dephlegmator through conduit 113 and from the upper chamber 102 of the condenser through conduit 114, the conduits 113 and 114 being merged at point 115 into a common conduit 116 which is joined at the point 79 to the conduit 70 feeding oxygen vapor to the low pressure column to provide reboil and to the conduit 34 which delivers the oxygen product. The cooled gaseous feed mixture, such as air, from the heat exchanger 11 is conducted by the conduit 12 into the upper end of the shell space 104 of the condenser and such air is partially liquefied upon heat exchange with the oxygen component. The partially liquefied air is withdrawn from the lower end of the shell space 104 through conduit 117 and fed to a phase separator 118. The liquid portion of the air collecting in the pool 119 of the phase separator is withdrawn through conduit 120 and fed to the base of the high pressure column or, as shown, merged with the liquid crude oxygen withdrawn from the high pressure column through conduit 20. The total vapor withdrawn from the phase separator 118 may flow through conduit 121 into the space 108 of the dephlegmator from which the vapor flows upwardly through the tubes 106 and undergoes partial condensation and partial rectification as described above. The liquefied portion of air enriched in oxygen collects in a pool 122 in the chamber 108 and the unliquefied portion of the air, rich in nitrogen, flows into the chamber 107 and is withdrawn therefrom through conduit 123. The conduit 123 communicates with a conduit 124 connected to the bottom of the high pressure column and to a conduit 125, having a control valve 126, connected to the circuit of the expansion engine 40. The liquefied oxygen enriched air collecting in the pool 122 is withdrawn through conduit 126 and merged with the liquid in conduit 120 or may be introduced into the base of the high pressure column. If it is desired to reduce the size of the dephlegmator 105 and employ the dephlegmator particularly to provide a low power source of fluid for the expansion engine 40, only a portion of the gaseous air from the phase separator 118 may be passed to the dephlegmator with the remainder flowing through conduit 128, having a control valve 129, to the base of the high pressure column. In such an arrangement the dephlegmator may be sized to provide a quantity of nitrogen rich vapor to meet the requirements of the expansion engine 40 with a slight excess for control flowing through the conduit 124 to the high pressure column. It is to be understood however that the total unliquefied portion of the air feed leaving the condenser 100 may be fed to the dephlegmator and thereby subjected to partial rectification. The feature of employing the combination of a condenser and a dephlegmator makes it possible to reduce the size of the dephlegmator and thereby decrease capital expenditure.

The operating example of FIGURE 1 applies to the arrangement of FIGURE 3 with the following changes: Of the 1300 pound mols of partly liquefied air at about −287° F. entering the phase separator 118, about 335 pound mols per hour in liquid phase at about −287° F. leaves through conduit 120 and about 965 pound mols per hour of air in vapor phase at about −287° F. flows from the phase separator; of the latter, about 728 pound mols per hour flows to the high pressure column through conduit 128 and about 237 pound mols per hour flows through conduit 121 to the dephlegmator. About 131 pound mols per hour of liquid air enriched in oxygen at about −289° F. flows from the dephlegmator through conduit 126 and about 106 pound mols per hour of nitrogen enriched air in vapor phase (about 92% nitrogen) at about −290° F. flows from the dephlegmator through conduit 123. Of the 106 pound mols per hour of nitrogen enriched air about 96 pound mols per hour flows to the expansion engine 40 and about 10 pound mols per hour flows to the high pressure column by way of conduit 124. Concerning the liquid oxygen, about 402 pound mols per hour at about −288° F. flows through conduit 68 and is divided at point 110 with about 116 pound mols per hour flowing to the dephlegmator through conduit 111 and about 286 pound mols per hour being conducted by conduit 112 to the condenser. The pressure of the high pressure column and hence the pressure of the feed mixture would be several pounds less than the example of FIGURE 1 and a further reduction in the pressure of the air feed may be obtained by feeding more or all of the unliquefied portion of the air from the phase separator 118 to the dephlegmator.

Although the present invention is disclosed in the environment of air separation it is to be understood that the principles of the present invention may be employed in connection with low temperature separation of other gaseous mixtures. It is to be also expressly understood that various changes and substitutions may be made in the various embodiments disclosed without departing from the spirit of the invention as well understood by those skilled in the art. Reference therefore will be had to the appended claims for a definition of the limits of the invention.

What is claimed is:

1. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, performing a first condensing-evaporating step including establishing heat exchange between cold gaseous material of a mass substantially equal to the mass of the gaseous mixture to be separated and liquid high boiling point component to vaporize liquid high boiling point component and further cool the gaseous material, the first condensing-evaporating step including utilization of vaporized liquid high boiling point component as reboil for the second fractionating zone, feeding further cooled gaseous material to the fractionating operation, performing a second condensing-evaporating step including establishing heat exchange between gaseous low boiling point fraction and liquid material of the operation to liquefy gaseous low boiling point fraction and vaporize liquid material, the liquid material being under low pressure relative to the gaseous low boiling point fraction and including components of the gaseous mixture with the percentage of high boiling point component being greater than the percentage of high boiling point component of the liquid high boiling point fraction, and utilizing liquefied low boiling point fraction as reflux for the first and second fractionating zones.

2. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, performing a first condensing-evaporating step including establishing heat exchange between cold gaseous material of a mass substantially equal to the mass of the gaseous mixture to be separated and liquid high boiling point component to vaporize liquid high boiling point component and further cool the gaseous material, the first condensing-evaporating step including utilization of vaporized liquid high boiling point component as reboil for the second fractionating zone, withdrawing vaporized liquid high boiling point component as product, feeding further cooled gaseous material to the fractionating operation, performing a second condensing-evaporating step including establishing heat exchange between gaseous low boiling point fraction and liquid material withdrawn from the second fractionating zone to liquefy gaseous low boiling point fraction and vaporize liquid material, the liquid material including components of the gaseous mixture with the percentage of the high boiling point component being greater than the percentage of high boiling point component of the liquid high boiling point fraction, the second condensing-evaporating step including utilization of vaporized liquid material in the second fractionating zone, and utilizing liquefied low boiling point fraction as reflux for the first and second fractionating zones.

3. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, performing a first condensing-evaporating step including establishing heat exchange between cold gaseous material of a mass substantially equal to the mass of the gaseous mixture to be separated and liquid high boiling point component to vaporize liquid high boiling point component and further cool the gaseous material, the first condensing-evaporating step including utilization of vaporized liquid high boiling point component as reboil for the second fractionating zone, feeding further cooled gaseous material to the first fractionating zone, performing a second condensing-evaporating step including establishing heat exchange between gaseous low boiling point fraction and liquid material of the operation to liquefy gaseous low boiling point fraction and vaporize liquid material, the liquid material being under low pressure relative to the gaseous low boiling point fraction and including components of the gaseous mixture with the percentage of the high boiling point component being greater than the percentage of high boiling point component of the liquid high boiling point fraction, and utilizing liquefied low boiling point fraction as reflux for the first and second fractionating zones.

4. Method of separating gaseous mixture into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of cooling compressed gaseous mixture to be separated, performing a first condensing-evaporating step including establishing heat exchange between substantially the total cold gaseous mixture to be separated and liquid high boiling point component to vaporize liquid high boiling point component and further cool the gaseous mixture, the first condensing-evaporating step including utilization of vaporized liquid high boiling point component as reboil for the second fractionating zone, feeding further cooled gaseous mixture to the fractionating operation, performing a second condensing-evaporating step including establishing heat exchange between gaseous low boiling point fraction and liquid material of the operation to liquefy gaseous low boiling point fraction and vaporize liquid material, the liquid material being under low pressure relative to the gaseous low boiling point fraction and including components of the gaseous mixture with the percentage of the high boiling point component being greater than the percentage of high boiling point component of the liquid high boiling point fraction, and utilizing liquefied low boiling point fraction as reflux for the first and second fractionating zones.

5. Method of separating gaseous mixture into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, performing a first condensing-evaporating step including establishing heat exchange between cold gaseous material and liquid high boiling point component to vaporize liquid high boiling point component and effect partial rectification of the gaseous material and provide vapor rich in low boiling point component and liquid rich in high boiling point component, the first condensing-evaporating step including utilization of vaporized liquid high boiling point component as reboil for the second fractionating zone, feeding vapor rich in low boiling point component and liquid rich in high boiling point component to the fractonating operation, performing a second condensing-evaporating step including establishing heat exchange between gaseous low boiling point fraction and liquid material of the operation to liquefy gaseous low boiling point fraction and vaporize liquid material, the liquid material being under low pressure relative to the gaseous low boiling point fraction and including components of the gaseous mixture with the percentage of the high boiling point component being greater than the percentage of high boiling point component of the liquid high boiling point fraction, and utilizing liquefied low boiling point fraction as reflux for the first and second fractionating zones.

6. Method of separating gaseous mixture into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, performing a first condensing-evaporating step including establishing heat exchange between cold gaseous material and liquid high boiling point component to vaporize liquid high boiling point component and effect partial rectification of the gaseous material and provide vapor rich in low boiling point component and liquid rich in high boiling point component, the first condensing-evaporating step including utilization of vaporized liquid high boiling point component as reboil for the second fractionating zone, feeding vapor rich in low boiling point component and liquid rich in high boiling point component to the fractionating operation, expanding vapor rich in low boiling point component with the production of external work to provide refrigeration for the operation, performing a second condensing-evaporating step including establishing heat exchange between gaseous low boiling point fraction and liquid material of the operation to liquefy gaseous low boiling point fraction and vaporize liquid material, the liquid material being under low pressure relative to the gaseous low boiling fraction and including components of the gaseous mixture with the percentage of the high boiling point component being greater than the percentage of high boiling point component of the liquid high boiling point fraction, and utilizing liquefied low boiling point fraction as reflux for the first and second fractionating zones.

7. Method of separating gaseous mixtures into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, performing a first condensing-evaporating step including establishing heat exchange between cold gaseous material of a mass substantially equal to the mass of the gaseous mixture to be separated and liquid high boiling point component to vaporize liquid high boiling point component and effect partial rectification of the gaseous material and vapor rich in low boiling point component and liquid rich in high boiling point component, the first condensing-evaporating step including utilization of vaporized liquid high boiling point component as reboil for the second fractionating zone, feeding vapor rich in low boiling point component and liquid rich in high boiling point component to the fractionating operation, performing a second condensing-evaporating step including establishing heat exchange between gaseous low boiling point fraction and liquid material of the operation to liquefy gaseous low boiling point fraction and vaporize liquid material, the liquid material being under low pressure relative to the gaseous low boiling point fraction and including components of the gaseous mixture with the percentage of the high boiling point component being greater than the percentage of high boiling point component of the liquid high boiling point fraction, and utilizing liquefied low boiling point fraction as reflux for the first and second fractionating zones.

8. Method of separating gaseous mixture into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of cooling compressed gaseous mixture to be separated, performing a first condensing-evaporating step including establishing heat exchange between cold gaseous mixture and liquid high boiling point component to vaporize liquid high boiling point component and effect partial rectification of the gaseous mixture and provide vapor rich in low boiling point component and liquid rich in high boiling point component, the first condensing-evaporating step including utilization of vaporized liquid high boiling point component as reboil for the second fractionating zone, feeding vapor rich in low boiling point component and liquid rich in high boiling point component to the fractionating operation, performing a second condensing-evaporating step including establishing heat exchange between gaseous low boiling point fraction and liquid material of the operation to liquefy gaseous low boiling point fraction and vaporize liquid material, the liquid material being under low pressure relative to the gaseous low boiling point fraction and including components of the gaseous mixture with the percentage of the high boiling point component being greater than the percentage of high boiling point component of the liquid high boiling point fraction, and utilizing liquefied low boiling point fraction as reflux for the first and second fractionating zones.

9. Method of separating gaseous mixture into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, passing cool gaseous material in heat interchange with liquid high boiling point component to vaporize liquid high boiling point component and effect partial liquefaction of the gaseous material, rectifying at least a part of the unliquefied portion of the gaseous material to provide vapor rich in low boiling point component and liquid rich in high boiling point component, the last-named rectifying step including heat interchange between unliquefied portion of the gaseous mixture and liquid high boiling point component to vaporize liquid high boiling point component, utilizing vaporized liquid high boiling point component as reboil for the second fractionating zone, feeding vapor rich in low boiling point component and liquid rich in high boiling point component to the fractionating operation, performing a condensing-evaporating step including established heat exchange between gaseous low boiling point fraction and liquid material of the operation to liquefy gaseous low boiling point fraction and vaporize liquid material, the liquid material being under low pressure relative to the gaseous low boiling point fraction and including components of the gaseous mixture with the percentage of the high boiling point component being greater than the percentage of high boiling point component of the liquid high boiling point fraction, and utilizing liquefied low boiling point fraction as reflux for the first and second fractionating zones.

10. Method of separating gaseous mixture into component gases employing a low temperature fractionating operation including preliminary separation in a first fractionating zone under superatmospheric pressure producing gaseous low boiling point fraction and liquid high boiling point fraction and a further separation in a second fractionating zone under relatively low pressure producing gaseous low boiling point component and liquid high boiling point component, comprising the steps of providing cool gaseous material under superatmospheric pressure from compressed gaseous mixture to be separated, the gaseous material including components of the gaseous mixture with the percentage of high boiling point component being less than the percentage of high boiling point component of the liquid high boiling point fraction, passing cool gaseous material in heat interchange with liquid high boiling point component to vaporize liquid high boiling point component and effect partial liquefaction of the gaseous material, rectifying at least a part of the unliquefied portion of the gaseous material to provide vapor rich in low boiling point component and liquid rich in high boiling point component, the last-named rectifying step including heat interchange between unliquefied portion of the gaseous mixture and liquid high boiling point component to vaporize liquid high boiling point component, utilizing vaporized liquid high boiling point component as reboil for the second fractionating zone, expanding vapor rich in low boiling point component with production of external work to provide refrigeration for the operation, feeding vapor rich in low boiling point component and liquid rich in high boiling point component to the fractonating operation, performing a condensing-evaporating step including establishing heat exchange between gaseous low boiling point fraction and liquid material of the operation to liquefy gaseous low boiling point fraction and vaporize liquid material, the liquid material being under low pressure relative to the gaseous low boiling point fraction and including components of the gaseous mixture with the percentage of the high boiling point component being greater than the percentage of high boiling point component of the liquid high boiling point fraction, and utilizing liquefied low boiling point fraction as reflux for the first and second fractionating zones.

11. Method of separating air into oxygen and nitrogen components employing a low temperature fractionating operation including preliminary separation in a first fractionating zone under superatmospheric pressure producing gaseous nitrogen fraction and liquid crude oxygen fraction and a further separation in a second fractionating zone under relatively low pressure producing gaseous nitrogen component and liquid oxygen component, comprising the steps of providing cool gaseous material under superatmospheric pressure from compressed air to be separated, the gaseous material including components of air with the percentage of oxygen component being less than the percentage of oxygen component of the crude oxygen fraction, performing a first condensing-evaporating step including establishing heat exchange between cold gaseous material of a mass substantially equal to the mass of the air to be separated and liquid oxygen component to vaporize liquid oxygen component and further cool the gaseous material, the first condensing-evaporating step including utilization of vaporized liquid oxygen component as reboil for the second fractionating zone, feeding further cooled gaseous material to the fractionating operation, performing a second condensing-evaporating step including establishing heat exchange between gaseous nitrogen fraction and liquid material withdrawn from the second fractionating zone to liquefy gaseous nitrogen fraction and vaporize liquid material, the liquid material including components of air with the percentage of oxygen component being greater than the percentage of oxygen component of the liquid crude oxygen fraction, the second condensing-evaporating step including utilizing vaporized liquid material in the second fractionating zone, and utilizing liquefied nitrogen fraction as reflux for the first and second fractionating zones.

12. Method of separating air into oxygen and nitrogen components employing a low temperature fractionating operation including preliminary separation in a first fractionating zone under superatmospheric pressure producing gaseous nitrogen fraction and liquid crude oxygen fraction and a further separation in a second fractionating zone under relatively low pressure producing gaseous nitrogen component and liquid oxygen component, comprising the steps of providing cool gaseous material under superatmospheric pressure from compressed air to be separated, the gaseous material including components of air with the percentage of oxygen component being less than the percentage of oxygen component of the liquid crude oxygen fraction, performing a first condensing-evaporating step including establishing heat exchange between cold gaseous material and liquid oxygen component to vaporize liquid oxygen component and effect partial rectification of the gaseous material and provide vapor rich in nitrogen component and liquid rich in oxygen component, the first condensing-evaporating step including utilization of vaporized liquid oxygen component as reboil for the second fractionating zone, feeding vapor rich in nitrogen component and liquid rich in oxygen component to the fractionating operation, performing a second condensing-evaporating step including establishing heat exchange between gaseous nitrogen fraction and liquid material withdrawn from the second fractionating zone to liquefy gaseous nitrogen fraction and vaporize liquid material, the liquid material including components of air with the percentage of oxygen component being greater than the percentage of oxygen component of the liquid crude oxygen fraction, the second condensing-evaporating step including utilizing vaporized liquid material in the second fractionating zone, and utilizing liquefied nitrogen fraction as reflux for the first and second fractionating zones.

13. Method of separating air into oxygen and nitrogen components employing a low temperature fractionating operation including preliminary separation in a first fractionating zone under superatmospheric pressure producing gaseous nitrogen fraction and liquid crude oxygen fraction and a further separation in a second fractionating zone under relatively low pressure producing gaseous nitrogen component and liquid oxygen component, comprising the steps of providing cool gaseous material under superatmospheric pressure from compressed air to be separated, the gaseous material including components of air with the percentage of oxygen component being less than the percentage of oxygen component of the liquid crude oxygen fraction, passing cool gaseous material in heat interchange with liquid oxygen component to vaporize liquid oxygen component and effect partial liquefaction of the gaseous material, rectifying at least a part of the unliquefied portion of the gaseous material to provide vapor rich in nitrogen component and liquid rich in oxygen component, the last-named rectifying step including heat interchange with liquid oxygen component to vaporize liquid oxygen component, utilizing vaporized liquid oxygen component as reboil for the second fractionating zone, feeding vapor rich in nitrogen component and liquid rich in oxygen component to the fractionating operation, performing a condensing-evaporating step including establishing heat exchange between gaseous nitrogen fraction and liquid material withdrawn from the second fractionating zone to liquefy gaseous nitrogen fraction and vaporize liquid material, the liquid material including components of air with the percentage of the oxygen component being greater than the percentage of oxygen component of the liquid crude oxygen fraction, the condensing-evaporating step including utilizing vaporized liquid material in the second fractionating zone, and utilizing liquefied nitrogen fraction as reflux for the first and second fractionating zones.

14. Apparatus for separating gaseous mixture in a low temperature operation, comprising a first fractionating means operating under superatmospheric pressure wherein the gaseous mixture undergoes preliminary separation producing liquid high boiling point fraction and gaseous low boiling point fraction, a second fractionating means operating under relatively low pressure wherein the separation is continued producing gaseous low boiling point component and liquid high boiling point component, means providing a stream of compressed gaseous mixture under superatmospheric pressure, means providing from the compressed gaseous mixture a stream of relatively cold gaseous material including components of the gaseous mixture with the percentage of high boiling point component being less than the percentage of the high boiling point component of the liquid high boiling point fraction, first heat exchange means for effecting heat interchange between liquid high boiling point component and cold gaseous material of a mass substantially equal to the mass of the stream of gaseous mixture to vaporize liquid high boiling point fraction as reboil for the low pressure fractionating means and to further cool the gaseous material, second heat exchange means for effecting heat interchange between gaseous low boiling point fraction and liquid material of the operation to liquefy gaseous low boiling point fraction as reflux for the fractionating means, the liquid material including components of the gaseous mixture with the percentage of high boiling point component being greater than the percentage of high boiling point component of the liquid high boiling point fraction, and means for feeding further cooled gaseous material to the fractionating means.

15. Apparatus for separating gaseous mixture in a low temperature operation, comprising a first fractionating means operating under superatmospheric pressure wherein the gaseous mixture undergoes preliminary separation producing liquid high boiling point fraction and gaseous low boiling point fraction, a second fractioning means operating under relatively low pressure wherein the separation is continued producing gaseous low boiling point component and liquid high boiling point component, means providing a stream of compressed gaseous mixture under superatmospheric pressure, means providing from the compressed gaseous mixture relatively cold gaseous material including components of the gaseous mixture with the percentage of the high boiling point component being less than the percentage of the high boiling point component of the liquid high boiling point fraction, first heat exchange means for effecting heat interchange between liquid high boiling point component and cold gaseous material to vaporize liquid high boiling point component as reboil for the low pressure fractionating means, the first heat exchange means including means for partly rectifying the gaseous material to provide vapor rich in the low boiling point component and liquid rich in the high boiling point component, second heat exchange means for effecting heat interchange between gaseous low boiling point fraction and liquid material of the operation to liquefy gaseous low boiling point fraction as reflux for the fractionating means, the liquid material including components of the gaseous mixture with the percentage of the high boiling point component being greater than the percentage of high boiling point component of the liquid high boiling point fraction, and means for feeding to the fractionating means vapor rich in the low boiling point component and liquid rich in the high boiling point component.

16. Apparatus as defined in claim 15 including means for expanding vapor rich in the low boiling point component with the production of external work to provide refrigeration for the operation.

17. Apparatus as defined in claim 15 in which the first heat exchange means includes a two pass heat exchange device and rectifying means for effecting partial rectification of at least a part of the gaseous material after flowing through the two pass heat exchange device to provide vapor rich in the low boiling point component and liquid rich in the high boiling point component.

18. Apparatus as defined in claim 17 including means for expanding vapor rich in low boiling point component with the production of external work to provide refrigeration for the operation.

References Cited in the file of this patent

UNITED STATES PATENTS

| | | |
|---|---|---|
| 2,487,147 | Latchum | Nov. 8, 1949 |
| 2,627,731 | Benedict | Feb. 10, 1953 |
| 2,648,205 | Hufnagel | Aug. 11, 1953 |
| 2,650,482 | Lobo | Sept. 1, 1953 |
| 2,850,880 | Jakob | Sept. 9, 1958 |
| 2,918,802 | Grunberg | Dec. 29, 1959 |
| 2,982,108 | Grunberg et al. | May 2, 1961 |
| 2,997,854 | Schilling et al. | Aug. 29, 1961 |

OTHER REFERENCES

German application 1,100,661, March 2, 1961.

UNITED STATES PATENT OFFICE
CERTIFICATE OF CORRECTION

Patent No. 3,113,854                          December 10, 1963

Joseph T. Bernstein

It is hereby certified that error appears in the above numbered patent requiring correction and that the said Letters Patent should read as corrected below.

Column 2, line 19, strike out "a"; line 54, for "varporization" read -- vaporization --; column 12, line 48, for "fractonating" read -- fractionating --; column 13, line 20, after "boiling" insert -- point --; column 14, line 1, for "mxture" read -- mixture --; line 50, for "utilizng" read -- utilizing --; line 55, for "established" read -- establishing --; column 15, line 23, for "fractonating" read -- fractionating --; column 17, line 30, for "fractioning" read -- fractionating --.

Signed and sealed this 9th day of March 1965.

(SEAL)
Attest:

ERNEST W. SWIDER                                         EDWARD J. BRENNER
Attesting Officer                                              Commissioner of Patents